(12) United States Patent
Silakov

(10) Patent No.: US 11,775,409 B1
(45) Date of Patent: Oct. 3, 2023

(54) SYSTEMS AND METHODS FOR DETECTING PROBLEMATIC PERFORMANCE ON A SOFTWARE INSTANCE

(71) Applicant: Virtuozzo International GmbH, Schaffhausen (CH)

(72) Inventor: Denis Silakov, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 0 days.

(21) Appl. No.: 17/565,635

(22) Filed: Dec. 30, 2021

(51) Int. Cl.
*G06F 11/00* (2006.01)
*G06F 11/32* (2006.01)
*G06F 11/34* (2006.01)
*G06F 11/07* (2006.01)
*G06F 11/30* (2006.01)

(52) U.S. Cl.
CPC .......... *G06F 11/327* (2013.01); *G06F 11/076* (2013.01); *G06F 11/0772* (2013.01); *G06F 11/3072* (2013.01); *G06F 11/3466* (2013.01)

(58) Field of Classification Search
CPC ............. G06F 11/3409; G06F 11/3065; G06F 11/3664; G06F 11/079; G06F 11/3476; G06F 11/3452
See application file for complete search history.

(56) References Cited

U.S. PATENT DOCUMENTS

| | | | |
|---|---|---|---|
| 2017/0251003 A1* | 8/2017 | Rostami-Hesarsorkh | G06N 5/01 |
| 2018/0039666 A1* | 2/2018 | Giuca | G06F 16/33 |
| 2022/0197879 A1* | 6/2022 | Jha | G06F 16/217 |

* cited by examiner

*Primary Examiner* — Charles Ehne
(74) *Attorney, Agent, or Firm* — ArentFox Schiff LLP; Michael Fainberg

(57) ABSTRACT

Disclosed herein are systems and method for detecting problematic performance on a software instance. In one aspect, the method includes: receiving, from a first software instance, a log file that lists actions performed on a computing device over a period of time; parsing the log file to identify, from the actions, a first sequence of actions performed on a given object; analyzing similarity between the first sequence of actions performed on the given object and at least one other sequence of actions performed on at least one other object of a same type, wherein the at least one other sequence of actions is indicative of problematic performance; in response to determining, based on the analysis of similarity, that the first sequence of actions is similar to the at least one other sequence of actions, generating an alert indicating the problematic performance on the first software instance.

18 Claims, 6 Drawing Sheets

SYSTEMS AND METHODS FOR DETECTING PROBLEMATIC PERFORMANCE ON A SOFTWARE INSTANCE

FIELD OF TECHNOLOGY

The present disclosure relates to the field of software reliability, and, more specifically, to systems and methods for detecting problematic performance on a software instance.

BACKGROUND

Most software programs log their actions in order to simplify analysis of their behavior. Generally, log files are used to identify the reason of problematic software behavior (e.g., a crash, a failure, an incorrect output, unpredictable behavior of any kind, etc.) or to reproduce the circumstances that led to the irregular behavior, but not to detect similar problems on other running instances of the same program. Therefore, there is a need for improving means of detection problematic performance on a software instance.

SUMMARY

In one exemplary aspect, the techniques described herein relate to a method for detecting problematic performance on a software instance, the method including: receiving, from a first software instance, a log file that lists actions performed on a computing device over a period of time; parsing the log file to identify, from the actions, a first sequence of actions performed on a given object; analyzing similarity between the first sequence of actions performed on the given object and at least one other sequence of actions performed on at least one other object of a same type, wherein the at least one other sequence of actions is indicative of problematic performance; in response to determining, based on the analysis of similarity, that the first sequence of actions is similar to the at least one other sequence of actions, generating an alert indicating the problematic performance on the first software instance.

In some aspects, the techniques described herein relate to a method, wherein identifying a first sequence of actions performed on a given object includes: identifying a given action, an actor that performed the given action, and an object on which the given action was performed.

In some aspects, the techniques described herein relate to a method, further including: identifying a timestamp of when the given action was performed; and arranging each action in a sequence based on respective timestamps corresponding to respective actions performed on the given object.

In some aspects, the techniques described herein relate to a method, wherein identifying a first sequence of actions performed on a given object further includes: determining a normalized identifier that can be used to match objects of the same type.

In some aspects, the techniques described herein relate to a method, wherein the problematic performance includes a high probability of one or more of a software bug, a crash, a failure, data loss, unpredictable behavior, and an incorrect output at the first software instance, occurring.

In some aspects, the techniques described herein relate to a method, wherein analyzing similarity between the first sequence of actions performed on the given object and the at least one other sequence of actions performed on the at least one other object of the same type includes: determining a distance value between the first sequence and the at least one other sequence; and determining whether the distance value is less than a threshold distance value.

In some aspects, the techniques described herein relate to a method, wherein determining that the first sequence of actions is similar to the at least one other sequence of actions includes determining that the distance value is less than the threshold distance value.

In some aspects, the techniques described herein relate to a method, wherein the threshold distance value is determined in advance using a machine learning algorithm that is configured to generate the threshold distance value based on respective distances between a number of sequences that are indicative of problematic performance and a number of sequences that are not indicative of the problematic performance.

In some aspects, the techniques described herein relate to a method, wherein the at least one other sequence of actions originates from at least one other computing device.

In some aspects, the techniques described herein relate to a method, further including: transmitting the alert to a user of the first software instance.

In some aspects, the techniques described herein relate to a method, further including: transmitting a command to a management tool on the computing device to fix a state of the given object.

In some aspects, the techniques described herein relate to a method, wherein types of objects include one or more of: a container, a virtual machine, an application, software defined storage metadata server, software defined storage data server, a file, a running process, a disk partition, and a file system.

In some aspects, the techniques described herein relate to a system for detecting problematic performance on a software instance, including: at least one hardware processor configured to: receive, from a first software instance, a log file that lists actions performed on a computing device over a period of time; parse the log file to identify, from the actions, a first sequence of actions performed on a given object; analyze similarity between the first sequence of actions performed on the given object and at least one other sequence of actions performed on at least one other object of a same type, wherein the at least one other sequence of actions is indicative of problematic performance; in response to determining, based on the analysis of similarity, that the first sequence of actions is similar to the at least one other sequence of actions, generate an alert indicating the problematic performance on the first software instance.

In some aspects, the techniques described herein relate to a system, wherein the at least one hardware processor is further configured to identify a first sequence of actions performed on a given object by: identifying a given action, an actor that performed the given action, and an object on which the given action was performed.

In some aspects, the techniques described herein relate to a system, wherein the at least one hardware processor is further configured to: identify a timestamp of when the given action was performed; and arrange each action in a sequence based on respective timestamps corresponding to respective actions performed on the given object.

In some aspects, the techniques described herein relate to a system, wherein the at least one hardware processor is further configured to identify a first sequence of actions performed on a given object by: determine a normalized identifier that can be used to match objects of the same type.

In some aspects, the techniques described herein relate to a system, wherein the problematic performance includes a high probability of one or more of a software bug, a crash, a failure, data loss, unpredictable behavior, and an incorrect output at the first software instance, occurring.

In some aspects, the techniques described herein relate to a system, wherein the at least one hardware processor is further configured to analyze similarity between the first sequence of actions performed on the given object and the at least one other sequence of actions performed on the at least one other object of the same type by: determining a distance value between the first sequence and the at least one other sequence; and determining whether the distance value is less than a threshold distance value.

In some aspects, the techniques described herein relate to a system, wherein the at least one hardware processor is further configured to determine that the first sequence of actions is similar to the at least one other sequence of actions by determining that the distance value is less than the threshold distance value.

In some aspects, the techniques described herein relate to a non-transitory computer readable medium storing thereon computer executable instructions for detecting problematic performance on a software instance, including instructions for: receiving, from a first software instance, a log file that lists actions performed on a computing device over a period of time; parsing the log file to identify, from the actions, a first sequence of actions performed on a given object; analyzing similarity between the first sequence of actions performed on the given object and at least one other sequence of actions performed on at least one other object of a same type, wherein the at least one other sequence of actions is indicative of problematic performance; in response to determining, based on the analysis of similarity, that the first sequence of actions is similar to the at least one other sequence of actions, generating an alert indicating the problematic performance on the first software instance.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
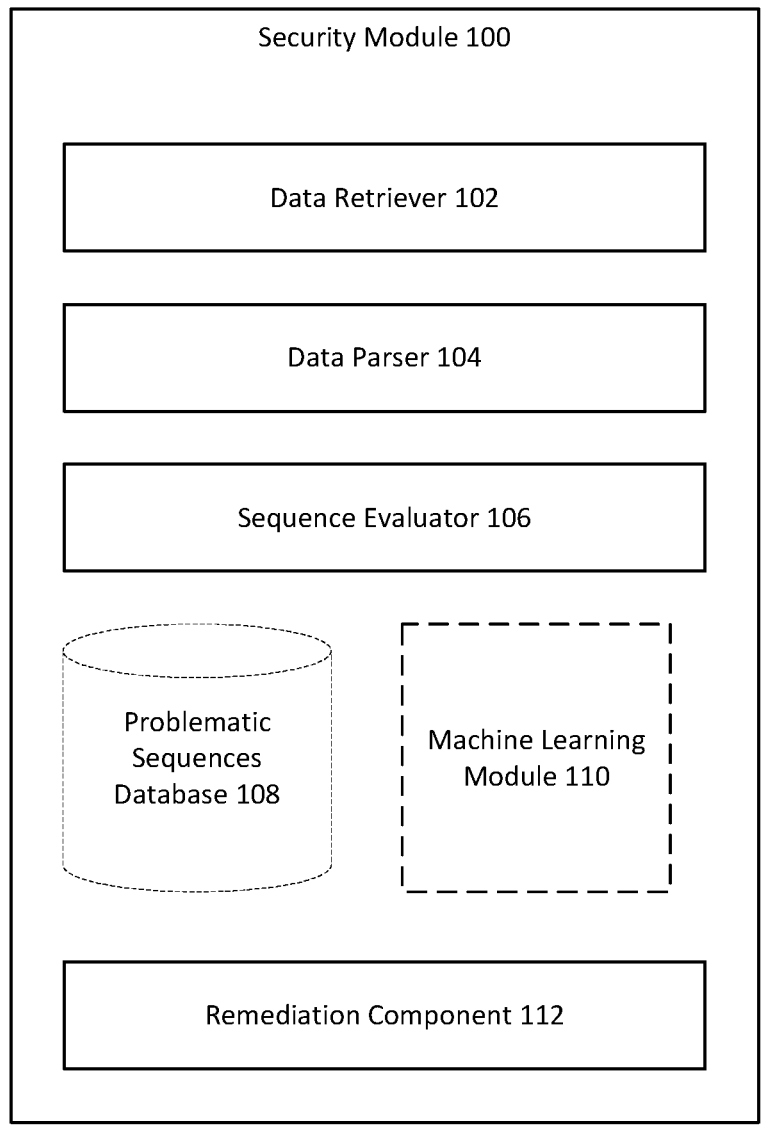
FIG. 1 is a block diagram illustrating a security module that detects problematic performance on a software instance.

Exemplary aspects are described herein in the context of a system, method, and computer program product for detecting problematic performance on a software instance. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Timely detection and/or prevention of problematic performance on a software instance (e.g., a running instance of a software program product, etc.) is extremely important to improve software instance stability and availability, to prevent user data loss, to restore normal behavior of the software instance, etc. This is especially important for cases where a significant amount of time can pass between the moment when irregular behavior was initiated and when the irregular behavior was discovered by user. For example, if several programs write data to the same file, there can be a race between the programs to write to the file and, without proper synchronization, the programs can break the contents of the file—rendering the file useless. It is not necessary that users will notice this immediately. If such a synchronization problem is found between two programs, it is important to analyze which files were processed by the programs simultaneously (or within a short period of time). If every program logs its actions (e.g., "started writing to file," "finished writing to file," etc.), it is possible to detect which files are potentially corrupted by analyzing the logs. In another example, suppose that due to a bug in a virtualization software, data loss occurs inside a virtual machine (VM) when one adds a new disk to the VM, then adds another disk, and then removes the first one. Once the bug is found, all potentially affected VMs should be identified. This cannot be done on the basis of VM state and current number of the disks alone. However, if the disk add/remove actions are logged, the logs can be analyzed to find all broken VMs.

In one exemplary aspect, log files of a computing node may be used to identify a set of steps that, when performed, make running software on the computing node work incorrectly. If steps can be associated with certain entries in the log file (e.g., an entry may correspond to an action performed in the system), looking for sets of corresponding log entries from other software product instances can be used to prevent similar misbehavior on other software product instances. In many cases, however, one cannot provide an exact sequence of log entries that would point out that the problem persists. In such cases, to check if some software instance has bugs, it is useful to somehow calculate the affinity or similarity of its log files with the logs from known problematic product instances.

Accordingly, the present disclosure describes systems and methods for analyzing log files from different instances of the same product, and detecting system objects which have a similar history (in terms of sequences of actions performed on them). If it is known that some object was corrupted, then the objects with similar histories can be found to check if they are already broken and fix them if needed.

FIG. 1 is a block diagram illustrating security module 100 that detects problematic performance on a software instance. Security module 100 may be installed on a computing device (e.g., a server) or be distributed over several computing devices (e.g., a plurality of different devices such as, for example, distributed systems or multiple servers utilized to perform operations "over the cloud", etc.) that monitor performance of a plurality of software product instances (e.g., running on a number of computing devices). Security module 100 includes various components including at least one of: data retriever 102, data parser 104, sequence evaluator 106, and remediation component 112. In one aspect, the security module 100 may also communicate with problematic sequences database 108, machine learning module 110. In another aspect, the problematic sequences database 108, and/or the machine learning module 110 may be a part of the security module 100.

In an exemplary aspect, data retriever 102 is configured to retrieve or receive, from a first software instance, a log file that lists actions performed on a computing device over a period of time.

In an exemplary aspect, data parser 104 is configured to parse the log file to identify, from the actions, a first sequence of actions performed on a given object of the first software instance. In one example, the software may be an application, a management tool, an operating system, a virtualization solution, software-defined storage solution, etc. and the types of objects may be, for example, virtual machines, containers, configuration files, virtual disk images, any software-defined storage components (e.g., metadata server (MDS), chunk server (CS), etc.), management tools, configuration files, files, running process, disk partitions, file systems, packages, applications, virtual devices, etc. For example, data parser 104, may for each entry in the log file, identify a given action, an actor that performed the given action, an object on which the given action was performed, and a timestamp of when the given action was performed.

In one aspect, the data parser 104 may, for one or more objects, create sequences of actions performed on these objects. In some aspects, data parser 104 may further organize the log file by grouping all actions performed on respective objects, and arranging, in each group, each action in a sequence based on respective timestamps corresponding to all actions performed on the respective objects. In some aspects, data parser 104 may further split the log file into a plurality of log files based on the grouping. In some aspects, data parser 104 may be configured to determining, for each object, a normalized identifier that can be used to match objects of a same type.

In one aspect, parsing may also be referred to as "pre-processing," and may be necessary to compare a sequence of actions to another sequence of actions. In one aspect, after pre-processing, every log entry may include an actor, an action performed by the actor, and objects of the action (e.g., "VM management tool"/"added disk"/"to VM1"). In some aspects, the timestamp of when the action is performed is temporarily retained to organize the actions based on when they occurred. In some aspects, however, details such as timestamps, action parameters, etc., are dropped for a generic representation of the action. For example, a parsed log may be organized as the following:

<package_manager> <updated> <kernel package>
<virtualization system> <started> <vm1>

As mentioned previously, in some aspects, data parser 104 may create, using all log files, sets of actions with every set containing all actions performed on particular system object (e.g., virtual machine, file, application, etc.). For example, consider a log with the following entries:

*<vmmanager> <created> <vm1>
*<vmmanager> <created> <vm2>
*<vmmanager> <started> <vm1>
*<user> <added_disk> <vm2>
*<user> <started> <vm2>

In this example, data parser 104 may generate two sequences of actions for the two objects from the log files—one for <vm1> and the other for <vm2>, preserving the sequence of actions:

1) vm1 actions
* <vmmanager> <created> <vm1>
* <vmmanager> <started> <vm1>
2) vm2 actions
* <vmmanager> <created> <vm2>
* <user> <added_disk> <vm2>
* <user> <started> <vm2>

In some cases, there may be several log files mentioning the same object. In some aspects, data parser 104 may create a sequence of actions for an object by retrieving, from log files (e.g., from all log files that mention the object, from a subset of log files such as those that mention important actions or actions related to a particular problematic performance being detected, etc.), actions performed on the object, and, optionally, in some aspects, using, the timestamps of the actions, to put the actions in the right historic order. In different aspects, the timestamps may or may not be included in the sequence of actions in order to either provide more accurate information, or to keep the sequence (or a sequence file if there is any) minimalistic for comparison purposes.

In some aspects, data parser 104, may also use the same or at least comparable normalized or anonymized identifiers for different objects of the same type. It should be noted that objects that are identical from a comparison perspective (e.g., objects of the same type) may have a different configuration, name, size, etc.

In one aspect, normalizing or anonymizing object names facilitates comparison of action sequences for the objects of the same type. For example, virtual machine (VM) names may be different in different log files, but the names are not important per se. For example, the parser logic may indicate to use 'VM' instead of any virtual machine name, 'CT' instead of any container name, 'CONFIG' instead of any system configuration file, and so on. In some aspect, data parser 104 uses abstract generic names for every type of objects. In one aspect, these generic names may be predefined, and/or may be stored in a database that data parser 104 refers to for normalization purposes, etc.

In one aspect, sequence evaluator 106 is also a part of a security module 100. In one aspect, sequence evaluator 106 evaluates whether a given sequence of actions performed on an object may be related to a problematic behavior or not. In one aspect, sequence evaluator 106 analyzes similarity (e.g., computes distance, etc.) between sequences of actions. In one aspect, sequence evaluator 106 compares (which may include analysis of similarity) sequences of actions. In one aspect, sequence evaluator 106 compares a given sequence of actions with a predefined one (e.g., a marker showing a problematic behavior, also called a "problematic sequence") and computes a measure of difference between the two sequences. In one aspect, subsequent to generating a first sequence of actions performed on a given object by parsing a log file by the security module 100 (e.g., by data parser 104 of the security module 100), sequence evaluator 106 of the security module 100 compares the first sequence of actions performed on the given object to at least one other sequence of actions performed on at least one other object of the same type.

In one aspect, the at least one other sequence of actions is retrieved from at least one other software instance (e.g., of the same or alike product, or a version of a product, that corresponds to the first software instance) and is indicative of problematic performance. In the context of the present disclosure, the problematic performance comprises a high probability of, for example, one or more of a software bug, a crash, a failure, an incorrect output, data loss, unpredictable behavior, etc.

In some aspects, the at least one other sequence of actions may be stored in problematic sequences database 108 (which, depending on an aspect, may be a part of the security module, or be available via network, etc.). Problematic sequences database 108 may include a plurality of problematic sequences and, in some aspects, may include an identifier of the software instance in which a given sequence originated from. For example, the identifier may be a name of the software product. In one aspect, for example, sequence evaluator 106 may retrieve the at least one other sequence of actions from problematic sequences database 108 that has the same identifier as the sequence being evaluated.

In one aspect, problematic sequences may be simplified (e.g., normalized and contain only markable actions) in other aspects, problematic sequences may contain additional information (e.g., additional actions, timestamps, comments, etc.) depending on whether the evaluation shall be faster or more precise.

One example of simplified problematic sequence that may be stored in problematic sequences database 108 is below. Consider the following example of a problematic sequence. To speed up incremental backups, virtualization software uses "dirty bitmaps" to track which parts of virtual machine (VM) disk were modified since the time the last backup was made. Every bit of such bitmap is responsible for the certain block of the disk of a fixed size, and if something is changed in this block after the last full backup, the bit is set to "1." For an incremental backup, it is enough to go through the dirty bitmap and only dump blocks for which the bits are set to "1." Unfortunately, under some circumstances, the bitmap can become inconsistent. This is not a big problem for a VM per se, but inconsistent bitmaps may lead to an inability to migrate VMs from one server to another. One of the possible action sequences to get a VM with an inconsistent bitmap is the following:
* create vm (actor: user)
* start vm (actor: user)
* full backup vm (actor: user) // at this stage bitmap is created, but not yet stored;
* stop vm (actor: user) // bitmap is stored to disk;
* start vm (actor: user) // bitmap is loaded and on disk marked IN_USE, which actually "inconsistent"; it is valid behavior; the flag will be unset on correct shutdown;
* kill vm (actor: kernel (for example, if VM consumed too many resources)) // bitmap is not stored, so it is still marked IN_USE in disk;
* start vm (actor: user) // bitmap is loaded, but it is inconsistent now, any migration will fail.

In one aspect, if the first sequence of actions is close to a problematic sequence of actions, sequence evaluator 106 may determine that the first sequence is indicative of problematic performance and remediation component 112 may perform a remediation action.

In one aspect, in response to determining, by the sequence evaluator 106 of the security module 100, based on the evaluation (e.g., which may include analyzing similarity between this and other sequences), that the first sequence of actions is similar (e.g., if a computed distance between them is less than a threshold) to the at least one other sequence of actions, remediation component 112 may generate an alert indicating the problematic performance on the first software instance.

In one aspect, a threshold may be received from machine learning module 110.

In some aspects, remediation component 112 may transmit the alert (e.g., may send notifications) to a corresponding computing node, to administrator or a corresponding management tool, user of the object, support team, etc., about potential problems that may occur on the particular object of the first software instance.

In some aspects, remediation component 112 may further transmit a command to a management tool on the computing device to fix a state of the given object. For example, remediation component 112 may instruct a task manager application to force quit/restart the software instance, backup user data, start recovery of the corresponding object, etc. In another example, remediation component 112 may disable the object (e.g., if the object is an optional plugin in the software instance that is not required for the software instance to run). In some aspects, remediation component 112 may also include the first sequence of actions in problematic sequences database 108.

Figure 2:
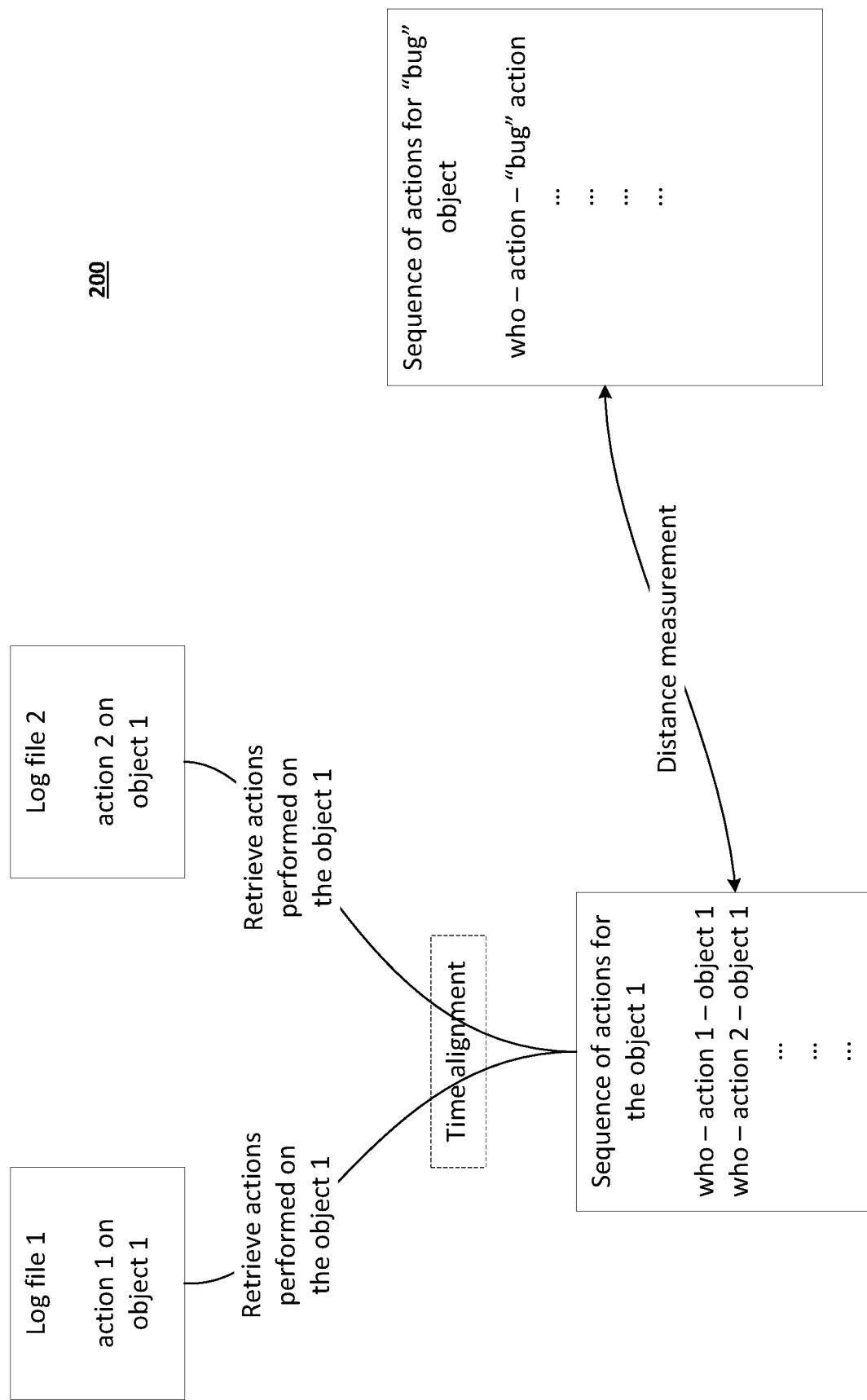
FIG. 2 is a block diagram illustrating an example of creating and comparing action sequences.

FIG. 2 is a block diagram illustrating example 200 of creating and comparing action sequences. When there are multiple log files (e.g., log files created by different components of a software instance, or by different components running on the sane computing machine with a software instance, or by different machines is the software instance is distributed on multiple machines, or taken by different software instances, etc.), security module 100 may use some of them (e.g., all, a subset, or one, etc.) to create a sequence of actions for at least one object mentioned in at least one log file. For the example shown on the figure, the security module may determine that an action was performed on an object (e.g., action 1) according to a first log file (e.g., log file 1) and another action was performed on the object (e.g., action 2) according to the second log file (e.g., log file 2). In one aspect, security module (e.g., data parser 104) may be further configured to retrieve all actions performed on the at least one object from a plurality of log files.

In one aspect, the actions shall be first ordered in the historic order before put into a sequence. In one aspect, these log files shall be describing actions performed around the same period of time (e.g., within a threshold window). Security module may order the actions using the timestamps in the log files, showing when the actions were performed. In one aspect, the security module generates a first sequence of actions for an object (e.g., object 1), which may be compared with at least one other sequence of actions (e.g., problematic sequences featuring bug actions) in order to measure the distance between them and make a decision about whether the first sequence shows problematic behavior or not, according to a decision rule. In one aspect, the decision rule may be comparing the distance (e.g., measure of similarity) with a threshold. In other examples, any other kinds of decision rules may be used. In one aspect, the decision rule depends on the distance measurement algorithm. In one aspect, a threshold or a decision rule is created or at least adjusted using machine learning module 110. In some aspects, there may be different thresholds for objects of different types. In one of such aspects, different thresholds for different types of objects may be calculated differently. In some aspects, objects of different types may be pre-processed differently and have different sets of problematic sequences.

In some aspects, sequence evaluator 106 may analyze similarity between a first sequence of actions performed on a given object and at least one other sequence of actions performed on at least one other object by determining a distance value between the first sequence and the at least one other sequence, and determining whether the distance value is less than a threshold distance value. For example, determining that the first sequence of actions is similar to the at least one other sequence of actions comprises determining that the distance value is less than the threshold distance value. Sequence evaluator 106 may use any metrics applicable for calculating differences between two sequences—such as Levenshtein distance, Hamming distance, any other edit distance, pattern checking, longest common subsequence determination, any kind of string similarity metric, string distance function, etc. In one example, the "edit distance" estimates a number of actions required to transform one sequence (sequence of actions in our case) to another.

In some aspects, machine learning module 110 may be used to get the threshold value. In some aspects, machine learning module 110 may be a part of the security module 100, or connected to the security module 100 via a network. In some aspects, the threshold value may be computed in advance and used by security module as a predefined value.

In some aspects, machine learning module 110 is used to determine the threshold distance value using a machine learning algorithm that is configured to generate or at least adjust the threshold distance value based on a set of sequences that indicative problematic performance and a set of sequences that are not indicative of the problematic performance and on respective distances between any of them. Referring to system 300, which will be described in greater detail below, in some aspects, the training of the machine learning algorithm may occur on high-level management server 314.

Figure 3:
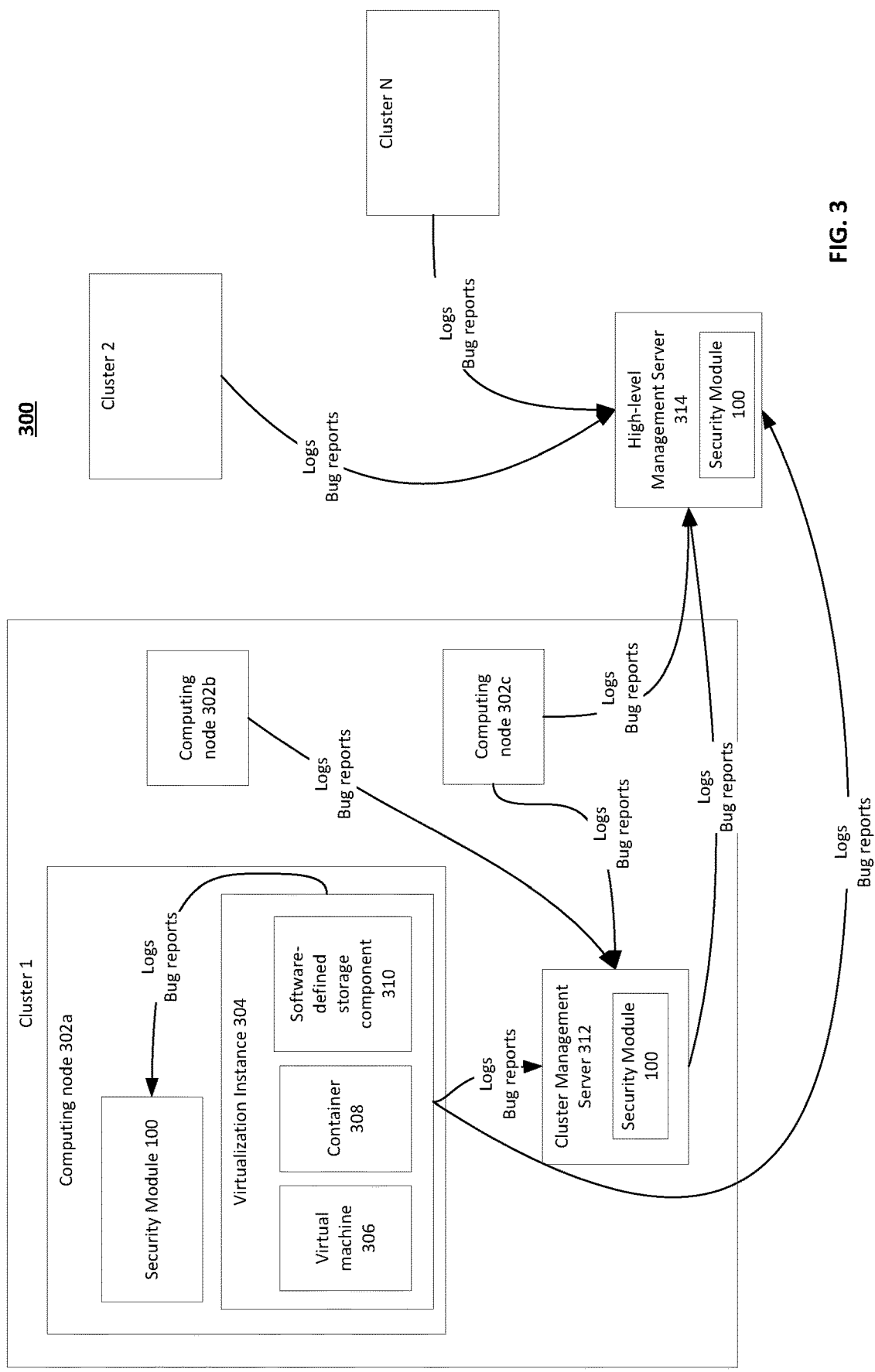
FIG. 3 is a block diagram illustrating a system in which a plurality of computing nodes in different clusters identify problematic performance of a software.

FIG. 3 is a block diagram illustrating system 300 in which a plurality of computing nodes in different clusters identify problematic performance of a software. At discussed previously, in some aspects, the security module may run on one computing device, or be split or distributed to a number of computing devices, or may connect receive needed information via network (e.g., log files, sequences for evaluation, problematic sequences, threshold, decision rules, etc.). In different aspects, a security module 100 may run on different computing devices, be a part of a cluster of computing devices or be independent, etc. In one aspect, a security module may run on at least one of: a computing node 302a, a cluster management server 312, a high-level management server 314, etc. In one aspect, the at least one other sequence of actions in problematic sequences database 108 does not necessarily need to come from the same computing device. In some aspects, the at least one other sequence of actions originate from at least one other computing device. For example, computing node 302a may execute security module 100, which retrieves log files from virtualization instance 304 (a software instance). Virtualization instance 304 may include objects such as virtual machine 306, container 308, and software-defined storage component 310, and any other. The sequence of actions generated from the logs of virtualization instance 304 may be compared to other sequence of actions from computing device 302b and/or computing device 302c that have their own variant of virtualization instance 304.

In some aspects, the at least one other computing device and the computing device comprising the first software instance are part of one cluster of computing devices (e.g., cluster 1). In some aspects, the at least one other computing device is part of a first cluster of computing devices and the computing device comprising the first software instance is part of a second cluster of computing devices. For example, the other computing devices may originate from cluster 2 and/or cluster N. In some aspects, any of the at least one other computing device is part of a first cluster of computing devices and the computing device comprising the first software instance may be an independent computing device and may be not part of any second cluster.

In FIG. 3, cluster 1 is shown to include cluster management server 312, which also may execute a security module 100. Server 312 may be a dedicated security server that receives logs from computing nodes in cluster 1 and identifies problematic performance via security module 100. In one aspect, security module 100 on each computing node (e.g., computing node 302a) may be a thin client that sends log reports to the thick client in security module 100 of cluster management server 312 and receives alerts of problematic performance. In one aspect, each software instance of a software product (e.g., virtualization instance 304) may send log files to a corresponding security module 100 according to its settings.

In FIG. 3, system 300 may further include high-level management server 314. In one aspect, high-level management server 314 has a corresponding security module. Server 314 is a dedicate security server that receives logs from computing nodes in multiple clusters and identifies problematic performance. High-level management server 314 may be used in place of cluster management server 312 (if a cluster does not have its own dedicated security server), or may be used in conjunction with cluster management server 312 (e.g., to confirm indications of problematic performance and reduce false positives).

Consider the following example of server 312, which is able to receive (or collect) problem reports (e.g., shown as bug reports) and log files from a set of computing nodes, and performs at least some of the actions described below.

In one aspect, a problem report or a bug report is associated with a set of log files describing which actions were performed on the "buggy" object (e.g., the one that started to behave unexpectedly) on the computing device where the bug occurred and is used for creation of problematic sequences corresponding to the bug.

In one aspect, the following example of the software instances may be: different instances of a hyper-converged virtualization and storage solution may run on the computing nodes (and may, for example, produce such logs and bug reports about its behavior or its system objects).

In one aspect, different types of objects may include virtual machines, containers, configuration files, virtual disk images, any software-defined storage components (e.g., metadata server (MDS), chunk server (CS), etc.), management tools, etc.

In one aspect, server 312 or node 302a, or server 314, etc., may collect logs, from a set of computing devices running software instances, related to the objects of the same type of the "bug" object. The collected logs are used to create sequences of actions performed on the objects. The data may be pre-processed (e.g., normalized by deleting irrelevant information, ordered by time alignment of actions retrieved from different log files) and analyzed to find out: an action performer (e.g., user, management component, object itself, etc.), the performed action, and the object the action was performed on. After pre-processing of the logs, for each object of the same type as the "bug" object, a sequence of logged actions that were performed on the particular object are identified.

In one aspect, the security module 100 on server 312 or node 302a, or server 314, etc., retrieves information for a sequence of actions performed on the "bug" object from the set of log files corresponding to the bug and then compares each retrieved sequence with the "bug" sequence.

The example shown on FIG. 3 is illustrative only and, in different aspects, any parts, components and devices shown on the figure may be omitted or replaced.

Figure 4:
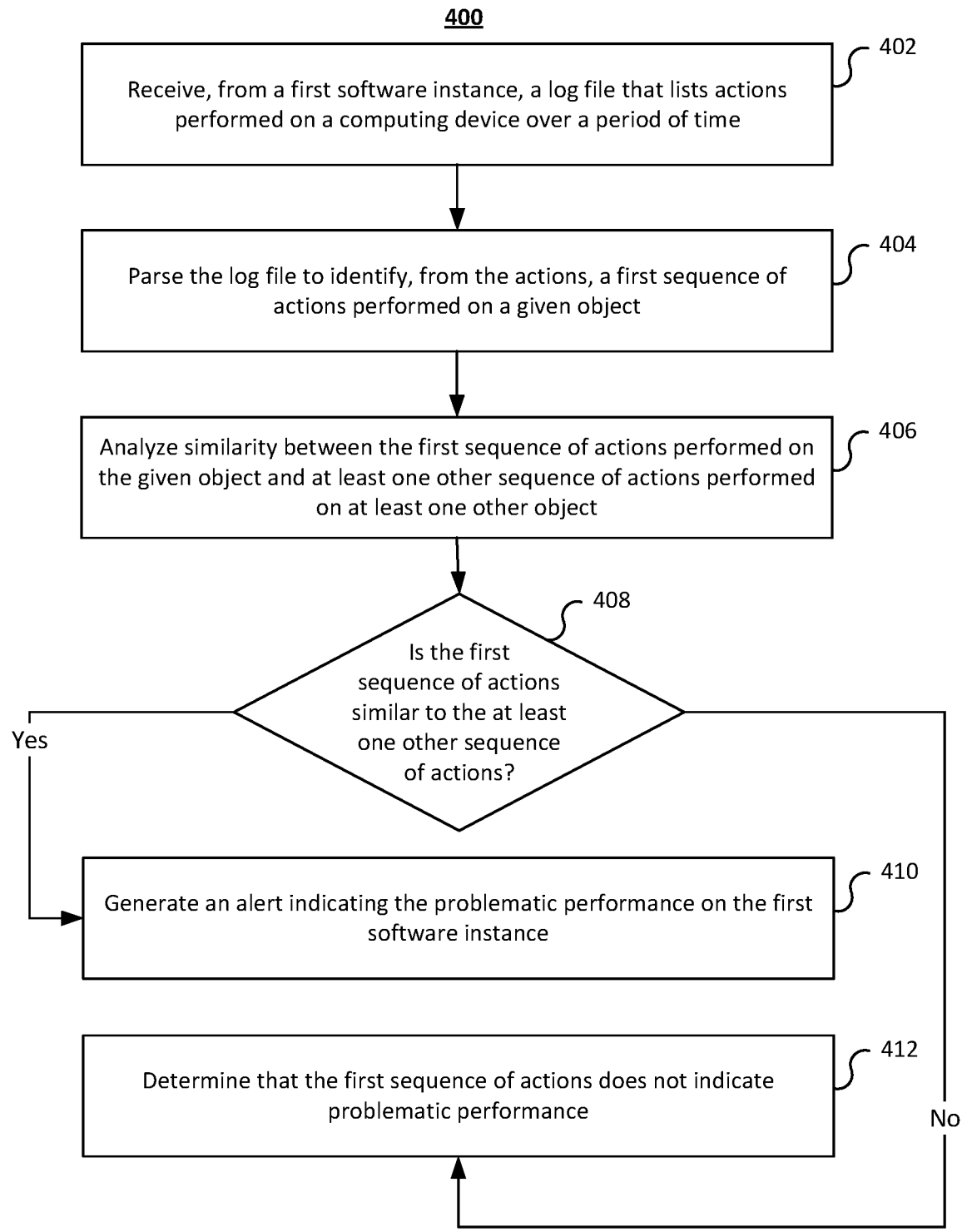
FIG. 4 illustrates a flow diagram of a method for detecting problematic performance on a software instance.

FIG. 4 illustrates a flow diagram of method 400 for detecting problematic performance on a software instance. At 402, security module 100 receives, from a first software instance, a log file that lists actions performed on a computing device over a period of time. At 404, security module 100 parses the log file to identify, from the actions, a first sequence of actions performed on a given object. At 406, security module 100 analyzes similarity between the first sequence of actions performed on the given object and at least one other sequence of actions performed on at least one other object of the same type. In some aspects, the at least one other sequence of actions is created based on at least one other software instance that corresponds to the first software instance. In some aspects, the at least one other sequence of actions is indicative of problematic performance. At 408, security module 100 determines, based on the analysis of similarity, whether the first sequence of actions is similar (e.g., the measure of similarity, computed during analysis, is less than a threshold, etc.) to the at least one other sequence of actions. In response to determining, based on the analysis of similarity, that the first sequence of actions is similar (e.g., corresponds, measure of similarity is less that a threshold defined for this type of objects, etc.) to the at least one other sequence of actions, method 400 advances to 410, where security module 100 generates an alert indicating the problematic performance on the first software instance. If the first sequence of actions is not similar to the at least one other sequence of actions, method 400 advances to 412, where security module 100 determines that the first sequence of actions does not indicate problematic performance.

Figure 5:
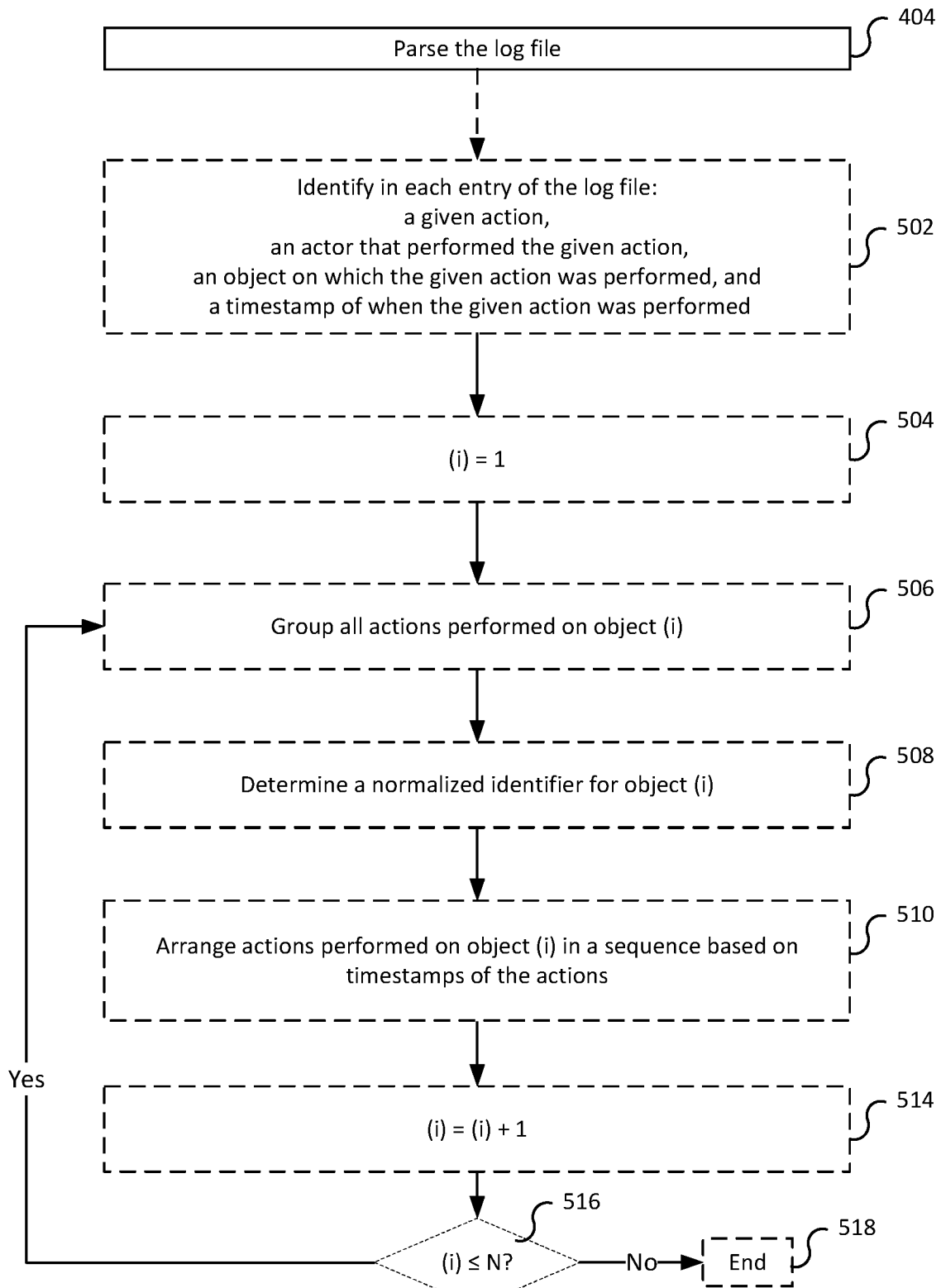
FIG. 5 illustrates a flow diagram of a method for parsing a log file.

FIG. 5 illustrates a flow diagram of method 500 for parsing a log file(s). Method 500 may be executed by security module 100 as a part of step 404 of method 400. At 502, security module 100 identifies in each entry of a log file at least one of: a given action, an actor that performed the given action, an object on which the given action was performed, and a timestamp of when the given action was performed. At 504, security module 100 begins iterating through each unique object (depending on an aspect, it may be each object mentioned in the files; each object of a particular type(s) that is mentioned in the log file(s), where in the particular type(s) may be a type(s) of objects that are being evaluated and/or a type(s) corresponding to a problematic sequence(s) being compared; each object of a set objects that shall be evaluated, for example, if security module was commanded not to check all objects, but only a set of them, etc.) on which an action was performed— starting with object (i)=1. At 506, security module 100 groups all actions performed on object (i) (e.g., object 1). At 508, security module 100 determines a normalized or anonymized identifier for object (i). At 510, security module 100 arranges actions performed on object (i) in a sequence based on timestamps of the actions. In one aspect, an additional optional step may be performed: security module 100 may generate a sequence file including only actions related to object (i); in another aspect, this step is not needed. At 514 and 516, security module 100 goes to a next object if there are any not yet analyzed objects. For examples, at 514, security module 100 increases the value of (i) by 1. For example, at 516, security module 100 determines whether the value of (i) is less or equal than N (e.g., the number of unique objects in the log file(s), or the number of unique objects of a particular type(s), or number of objects that shall be evaluated, etc.). If the value of (i) is less than N, method 500 returns to 506, where security module 100 groups all actions performed on the subsequent object (e.g., object 2). However, if (i) is not less than N, method 500 advances to 518 and ends.

Figure 6:
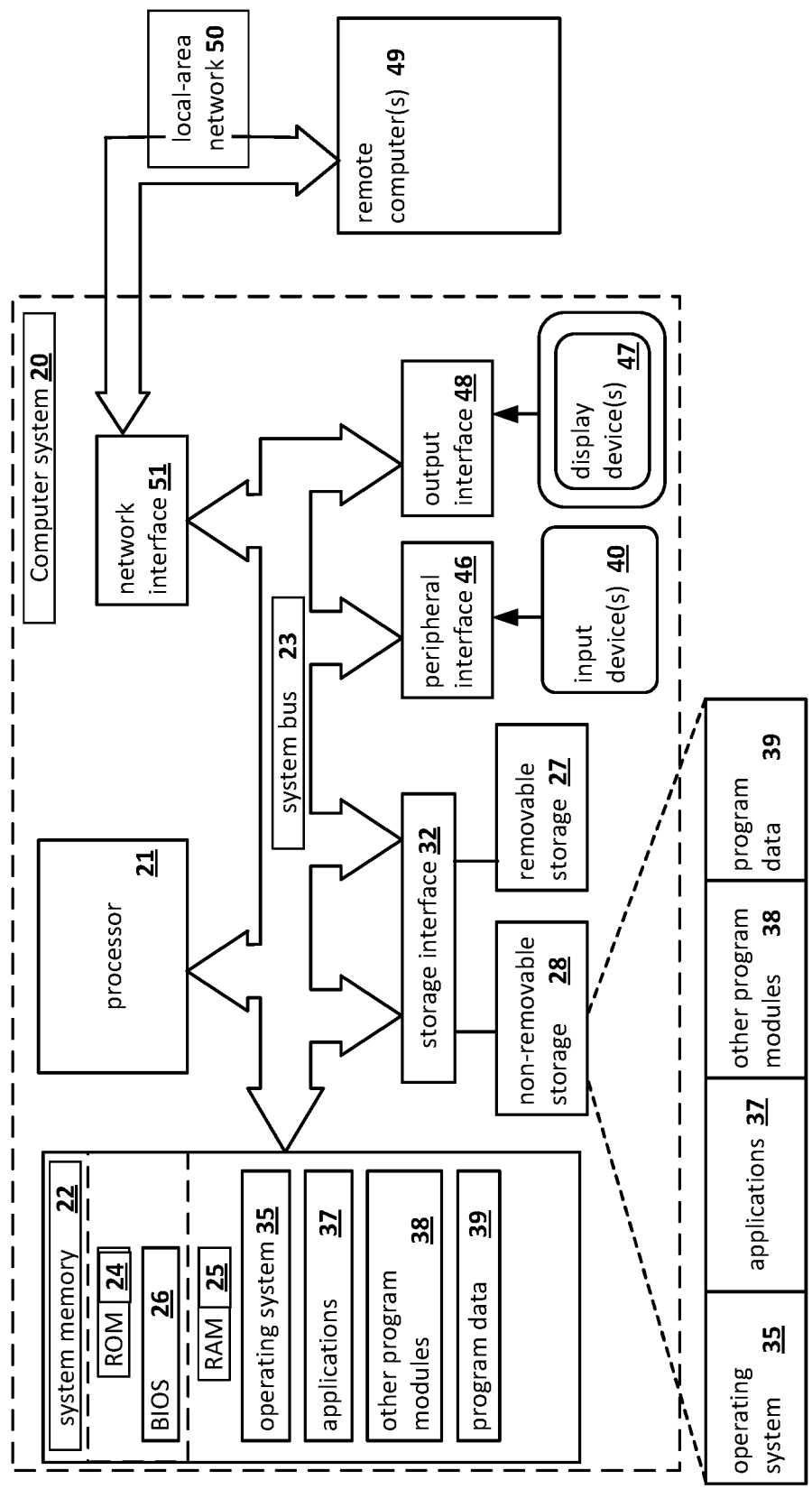
FIG. 6 presents an example of a general-purpose computer system on which aspects of the present disclosure can be implemented.

FIG. 6 is a block diagram illustrating a computer system 20 on which aspects of systems and methods for detecting problematic performance on a software instance may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-5 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting problematic performance on a software instance, the method comprising:
   receiving, from a first software instance, a log file that lists actions performed on a computing device over a period of time;
   parsing the log file to identify, from the actions, a first sequence of actions performed on a given object;
   analyzing similarity between the first sequence of actions performed on the given object and at least one other sequence of actions performed on at least one other object of a same type, wherein the at least one other sequence of actions is indicative of problematic performance, wherein analyzing the similarity comprises:
      determining a distance value between the first sequence and the at least one other sequence; and
      determining whether the distance value is less than a threshold distance value;
   in response to determining, based on analyzing the similarity, that the first sequence of actions is similar to the at least one other sequence of actions, generating an alert indicating the problematic performance on the first software instance.

2. The method of claim 1, wherein identifying a first sequence of actions performed on a given object comprises:
   identifying a given action, an actor that performed the given action, and an object on which the given action was performed.

3. The method of claim 2, further comprising:
   identifying a timestamp of when the given action was performed; and
   arranging each action in a sequence based on respective timestamps corresponding to respective actions performed on the given object.

4. The method of claim 1, wherein identifying a first sequence of actions performed on a given object further comprises:
   determining a normalized identifier that can be used to match objects of the same type.

5. The method of claim 1, wherein the problematic performance comprises a high probability of one or more of a software bug, a crash, a failure, data loss, unpredictable behavior, and an incorrect output at the first software instance, occurring.

6. The method of claim 1, wherein determining that the first sequence of actions is similar to the at least one other sequence of actions comprises determining that the distance value is less than the threshold distance value.

7. The method of claim 1, wherein the threshold distance value is determined in advance using a machine learning algorithm that is configured to generate the threshold distance value based on respective distances between a number of sequences that are indicative of problematic performance and a number of sequences that are not indicative of the problematic performance.

8. The method of claim 1, wherein the at least one other sequence of actions originates from at least one other computing device.

9. The method of claim 1, further comprising:
   transmitting the alert to a user of the first software instance.

10. The method of claim 1, further comprising:
    transmitting a command to a management tool on the computing device to fix a state of the given object.

11. The method of claim 1, wherein types of objects comprise one or more of:
    a container, a virtual machine, an application, software defined storage metadata server, software defined storage data server, a file, a running process, a disk partition, and a file system.

12. A system for detecting problematic performance on a software instance, comprising: at least one hardware processor configured to:
    receive, from a first software instance, a log file that lists actions performed on a computing device over a period of time;
    parse the log file to identify, from the actions, a first sequence of actions performed on a given object;
    analyze similarity between the first sequence of actions performed on the given object and at least one other sequence of actions performed on at least one other object of a same type, wherein the at least one other sequence of actions is indicative of problematic performance, wherein analyzing the similarity comprises:
       determining a distance value between the first sequence and the at least one other sequence; and
       determining whether the distance value is less than a threshold distance value;
    in response to determining, based on analyzing the similarity, that the first sequence of actions is similar to the at least one other sequence of actions, generate an alert indicating the problematic performance on the first software instance.

13. The system of claim 12, wherein the at least one hardware processor is further configured to identify a first sequence of actions performed on a given object by:
    identifying a given action, an actor that performed the given action, and an object on which the given action was performed.

14. The system of claim 13, wherein the at least one hardware processor is further configured to:
    identify a timestamp of when the given action was performed; and
    arrange each action in a sequence based on respective timestamps corresponding to respective actions performed on the given object.

15. The system of claim 12, wherein the at least one hardware processor is further configured to identify a first sequence of actions performed on a given object by:

determine a normalized identifier that can be used to match objects of the same type.

16. The system of claim 12, wherein the problematic performance comprises a high probability of one or more of a software bug, a crash, a failure, data loss, unpredictable behavior, and an incorrect output at the first software instance, occurring.

17. The system of claim 12, wherein the at least one hardware processor is further configured to determine that the first sequence of actions is similar to the at least one other sequence of actions by determining that the distance value is less than the threshold distance value.

18. A non-transitory computer readable medium storing thereon computer executable instructions for detecting problematic performance on a software instance, including instructions for:

receiving, from a first software instance, a log file that lists actions performed on a computing device over a period of time;

parsing the log file to identify, from the actions, a first sequence of actions performed on a given object;

analyzing similarity between the first sequence of actions performed on the given object and at least one other sequence of actions performed on at least one other object of a same type, wherein the at least one other sequence of actions is indicative of problematic performance, wherein analyzing the similarity comprises:
determining a distance value between the first sequence and the at least one other sequence; and
determining whether the distance value is less than a threshold distance value;

in response to determining, based on analyzing the similarity, that the first sequence of actions is similar to the at least one other sequence of actions, generating an alert indicating the problematic performance on the first software instance.

\* \* \* \* \*